Figures 1, 2:
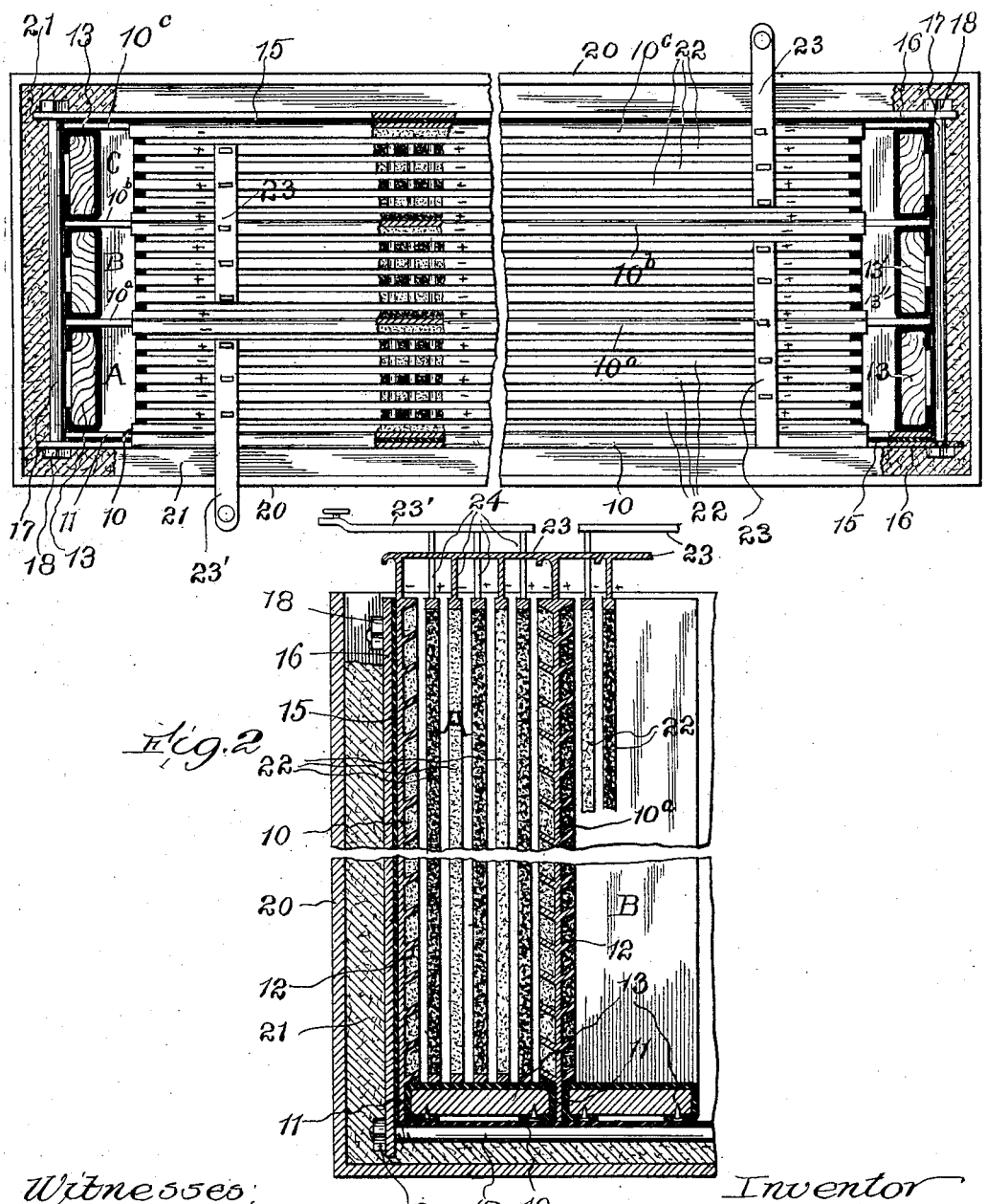

No. 762,715. PATENTED JUNE 14, 1904.
J. E. HASCHKE.
ELECTRICAL BATTERY.
APPLICATION FILED FEB. 8, 1904.
NO MODEL. 2 SHEETS—SHEET 1.

Witnesses
Ray White
Frank Hulett

Inventor
Julius E. Haschke.
BY Foree Bain
Atty.

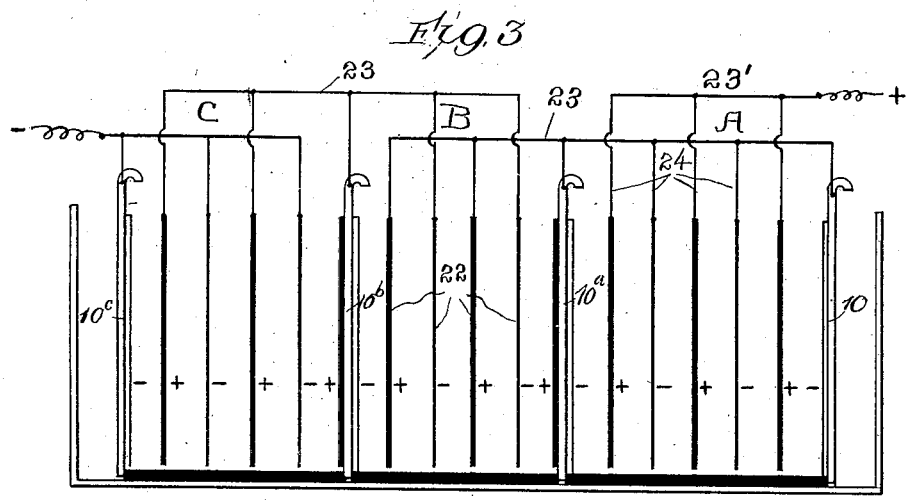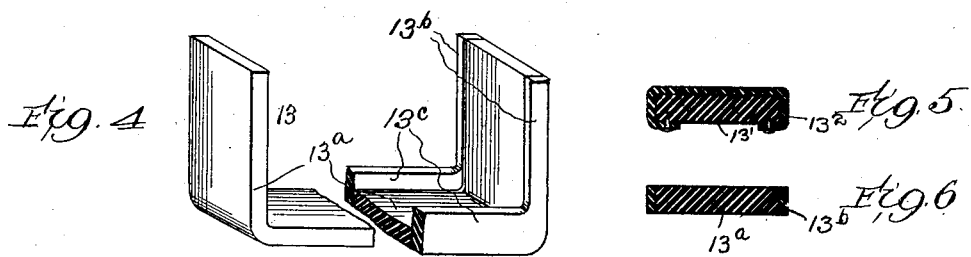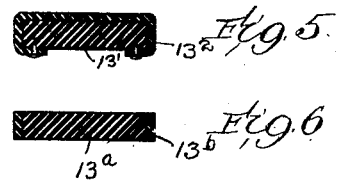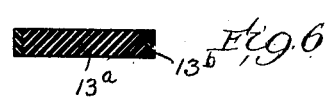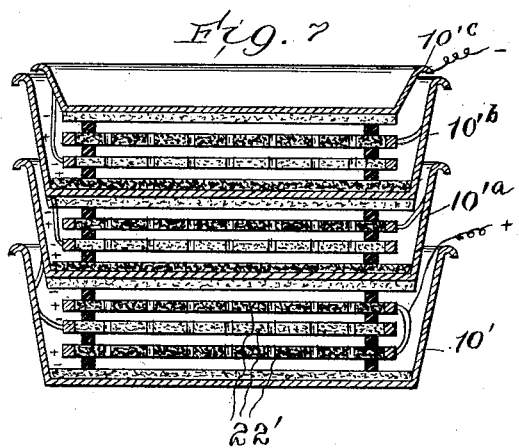

No. 762,715. Patented June 14, 1904.

UNITED STATES PATENT OFFICE.

JULIUS E. HASCHKE, OF CHICAGO, ILLINOIS, ASSIGNOR TO FEODOR G. HASCHKE, OF AUSTIN, TEXAS.

ELECTRICAL BATTERY.

SPECIFICATION forming part of Letters Patent No. 762,715, dated June 14, 1904.

Application filed February 8, 1904. Serial No. 192,545. (No model.)

*To all whom it may concern:*

Be it known that I, JULIUS E. HASCHKE, of Chicago, in the county of Cook and State of Illinois, have invented certain new and useful Improvements in Electric Batteries; and I hereby declare that the following is a full, clear, and exact description thereof, reference being had to the accompanying drawings, which form part of this specification.

My invention relates to electric batteries, either reversible or primary galvanic batteries, and has among its salient objects to provide a battery construction whereby the active surface exposure of a battery of given dimensions may be greatly increased, to provide an arrangement and construction whereby all plates having only a single surface exposed to the electrolyte may be made negative in character, and to provide a light, compact, economical and generally improved construction of batteries of the class described.

With a view to attaining these and other objects, which will become apparent to those skilled in the art from the following description, my invention consists in the features of construction and combinations of parts hereinafter more fully described, and specified in the claims.

While in the drawings I have shown, primarily, a form of battery embodying numerous features which I consider to be of great advantage, it will become apparent that certain of the features of my invention might be employed to the exclusion of others, with some of the attendant advantages incident to the use of the complete organization suggestively illustrated.

In the drawings, Figure 1 is a top plan view, with parts broken away, of a battery embodying my invention. Fig. 2 is a fragmentary section of a battery, taken on lines 2 2 of Fig. 1, but for clearness showing the connecting-bars in slightly-distorted position. Fig. 3 is a diagrammatic illustration of the arrangement and connections for the battery illustrated in Fig. 1. Fig. 4 is a detail of one of the insulating casing members detached. Fig. 5 is a view showing the sectional structure of one form of casing unit. Fig. 6 is a similar view showing the cross-sectional structure of a modified construction of the casing members. Fig. 7 is a sectional view of another form of battery, illustrating the application of certain features of my invention thereto.

Throughout the drawings like characters of reference refer always to like parts.

For economy of space and convenience of manufacture my invention contemplates the construction of a multiple-cell high-voltage battery wherein the side walls of the respective cells are formed by active plates or battery elements separated and definitely positioned by insulated casing sections or members of suitable contour interposed between the said plates to form the end and bottom walls of the respective cells, the parts being held together by side clamping-plates connected by suitable tie-rods or like agencies extending transversely of the completed battery structure from side to side thereof. In the drawings I have illustrated a battery comprising three such cells; but it will be apparent that the construction is susceptible of indefinite extension.

10, $10^a$, $10^b$, and $10^c$ indicate, respectively, what I will term "separating" battery-plates and which form the imperforate side walls of three cells A, B, and C. Each imperforate separating-plate is provided with a marginal web 11, free from ribs or projections, and has a ribbed surface or surfaces 12 within the unribbed margin.

It will be understood that the exterior side plates 10 and $10^c$ are provided with ribs upon their inwardly-facing surfaces only and are adapted to constitute unipolar plates or elements, while all intermediate separating-plates are provided with ribs upon both of their side faces and are adapted to constitute bipolar plates or elements.

13 13 indicate impervious insulating casing sections or members, each comprising a substantially flat bottom portion and upturned ends interposed between the plates to coact therewith to form liquid-tight cells. Two constructions of such casing-sections are herein suggested, 5 and 6, the one, Fig. 5, comprising a strip of wood 13', bent to proper form and covered upon its inner and edge surface with a web of soft rubber 13'', suitably secured to the wood, as by tacks or like fastenings, and the other (illustrated in Fig. 6) comprising a body of hard rubber $13^a$, having its edges overlaid with soft-rubber gaskets $13^b$, said gaskets $13^b$ being so proportioned that they project above the interior bottom edges of the body portion $13^a$ a short distance, as indicated at $13^c$. When the casing members and gaskets last described are employed, the rubber gaskets overlie the lower extremities of the active separating-plates and prevent slight accumulations of disintegrated active material from short-circuiting said plates. Either form of casing member employed, however, is arranged with its soft-rubber edging in contact with the unribbed margins of the separating active plates, the soft rubber forming a compressible packing to secure a tight joint. Any insulating construction providing an imperforate body of proper strength and contour and an edging of compressible material may be employed for the sections 13, however.

15 15 indicate sheets of celluloid or like insulating material laid over the side faces of the exterior plates 10 and $10^c$, and 16 16 indicate metallic clamping-plates of slightly-greater length than the plates 10 $10^a$, &c., superposed upon said insulating-sheets, with their ends projecting beyond the ends of the cells proper.

Suitable tie devices, such as the screw-threaded tie-rods 17 17, extend through the plates 16 on the ends and bottom thereof and are provided with nuts 18 to draw the plates together and hold the entire structure in a rigid unitary form. The soft-rubber edge portions of the casing-sections 13 being compressed against the separating-plates when the nuts are tightened constitute of the assembled devices a series of liquid-tight cells separated by the imperforate active bipolar plates and adapted to contain separate bodies of electrolytes.

19 indicate strips of celluloid or other insulating material, arranged to overlie the bolts 17.

The assembled cell structure is preferably inserted in a suitable metallic box or receptacle 20, and the space intervening between said box and the cell structure is filled with some suitable impervious packing, such as hard paraffin, as indicated at 21.

As heretofore stated, one of the objects of my invention is to obtain a great extent of exposed active surface in a cell of relatively small dimensions, and to this end I arrange in the electrolyte intermediate the active separating-plates constituting side walls of the cells supplemental or additional active plates arranged to permit circulation of the electrolyte therethrough or therearound in any preferred manner and electrically connect said supplemental plates and the separating-plates in groups of like polarity, to the end that their combined effect may be equal to that of two single opposed plates of unlike polarity having a total surface area equal to that of the group. To this end the number of active elements or surfaces in each cell should be such and their relative arrangement should be such that elements or surfaces of opposite polarity alternate throughout the cell.

To avoid confusion, I shall throughout this specification use the terms "positive" and "negative" in the sense of positive pole and negative pole, a peroxid plate being considered as a positive or positive-pole plate and indicated by the symbol + upon the drawings.

It is well known by those skilled in the art that it is disadvantageous for many reasons to employ in any cell a positive-pole plate coated with active material upon one side only, one of such reasons being the tendency of said plate to warping or self-destruction when the battery is active. My invention therefore contemplates the provising of a battery wherein both of the outside plates 10 and $10^c$ are negative and the arrangement of the supplemental plates to advantageously utilize such construction. Figs. 1 and 3 plainly illustrate mechanically and diagrammatically an arrangement and connection whereby I am able to accomplish these results.

22 22 indicate the supplemental or additional plates arranged between the separating-plates or side walls of the cells, such supplemental plates being preferably shorter than the cells and being preferably also perforated in order that free circulation of the electrolyte therethrough may be attained. To conveniently secure the connection of the proper supplemental plates to the active plates constituting the side walls of the cells, I provide each of said active separating-plates near one end with a connecting-strip 23, preferably extending in both directions therefrom, and I provide each of the supplemental plates with a projecting connecting-piece 24, suitably positioned for registration with connecting-strips 23. The connecting-strips 23 being preferably on all of the plates offset an equal distance from the ends thereof, the plates may be constructed practically all alike, the slight variation of connection in one or both of the end cells which is necessary being provided for in practice by special construction. Adjacent separating-plates $10^a$ $10^b$, &c., are reversely arranged, so that at each end of said cell structure a connecting rod or strip 23 extends across the cell from the separating-plate forming each side wall thereof.

Assembling this battery the plates are connected as follows: In the end cell C, which is to carry the negative terminal of the exterior circuit connections, a group of plates even in number is inserted and alternate plates, which are to be negative-pole plates, are connected to the connecting-strip 23 from the end plate 10°, which is also negative. The intermediate alternate plates, which are positive, are connected to the connecting-strip 23 of the next adjacent separating-plate 10ᵇ whose surface presented toward the cell C is of a positive character considered with reference to its terminal. In the next adjacent cell B the plates are likewise even in number, the negative-pole plates being connected to the strip 23 of the separating-plate 10ᵇ whose proximate case is negative, and the positive-pole intermediate plates being connected to the connecting-strips of the plate 10ᵃ whose proximate surface is likewise positive. This arrangement is continued throughout any number of cells until the last one—cell A in the present instance—is reached. In said cell A the confronting surfaces of both walls 10ᵃ and 10 are preferably negative-pole surfaces, and I therefore provide in said end cell an uneven number of supplemental plates, the number of positive-pole supplemental plates exceeding the number of negative-pole supplemental plates by one. The plates in this cell A are also arranged to alternate in character, so that positive plates have opposed thereto on both sides negative active surfaces. In this case the connecting-strip from the plate 10ᵃ is extended and directly connected metallically to the plate 10, and an additional connecting-strip 23', disconnected from the separating-plates, is provided to connect the positive plates. The negative pole or terminal of the battery, considered with reference to the exterior circuit, is applied to this last-mentioned connecting-strip 23'.

It will be apparent that in a single-cell battery the arrangement would be as in cell A of the multiple-cell structure and that the simplest expression of this phase of the invention would include only the two negative side plates and a single positive intermediate plate.

It will be understood that the manner of arrangement and connection of the separating and supplemental plates may be utilized in various forms of battery, and simply for purposes of suggestion of one of its many possible adaptations, such as would occur to those skilled in the art, I have herein illustrated in Fig. 7 a secondary battery of tray form, wherein 10', 10'ᵃ, 10'ᵇ, and 10'ᶜ are the trays separating the battery into three cells or compartments A', B', and C', each of said cells or compartments being provided with a suitable number of supplemental plates 22', whereof an uneven number are provided in the lowermost cell or compartment A' and an even number in the succeeding compartments B' and C'. It will be observed that the system of connections heretofore outlined is carried out and that the same results follow so far as the preservation of proper polarity in the end walls or trays is concerned as in the style of battery illustrated in the other figures.

I have herein illustrated my invention as applied to a reversible galvanic battery; but it will be obvious that it might be employed in the construction of primary batteries.

While I have herein described in some detail a specific embodiment of my invention, I do not desire, however, to be understood as limiting myself thereto in all particulars, as it will be apparent that many changes might be made in the embodiment of my invention without departing from its spirit and scope.

Having described my invention, what I claim, and desire to secure by Letters Patent of the United States, is—

1. In an electric battery comprising a plurality of cells, bipolar active plates separating the cells from each other, unipolar negative-pole plates constituting the exterior side plates of the end cells, and an odd number of supplemental plates of alternating polarities in the end cell wherein both side plates are negative-pole electrodes, the supplemental plates in said cell including one positive-pole plate in excess of the number of negative-pole plates, and the plates of like polarity in the cell being electrically connected.

2. In an electric battery composed of a series of cells, bipolar active plates separating said cells, active supplemental plates in a given cell electrically connected to the active surface of like polarity of the bipolar separating-plate constituting a wall of said cell, and other active supplemental plates of opposite polarity alternating in position with the first-mentioned supplemental plates, electrically connected to the like polar surface of the bipolar separating-plate constituting another wall of said cell.

3. In an electric battery, a plurality of cells having their adjacent side walls constituted for active separating-plates, the extreme plates being unipolar and negative in character, and the intervening separating-plates being bipolar, a group of supplemental plates arranged in each of the cells, the number of supplemental plates in each cell presenting on its opposite sides active surfaces of opposite polarity being even, and the number of plates in the end cell presenting opposite active surfaces of like polarity being uneven, the active plates in all of the cells being of alternate polarity, and a connection in each cell between all plates of like polarity.

4. In an electric-battery cell active side plates, a casing-section interposed between the said plates, a body of soft rubber interposed between each plate and the casing-section, and means for holding the active plates in positions to maintain said bodies of rubber under compression sufficient to maintain liquid-tight joints between the parts enumerated.

5. In an electric-battery cell, a casing comprising a pair of active plates constituting the side walls of the cell, a casing member adapted to form a bottom and end walls, arranged between said side walls, gaskets interposed between said member and the plates, having a horizontal portion extending up into the interior of the cell and overlying the lower portions of the plates, and means for securing the plates together to form a liquid-tight cell structure.

6. A bipolar battery-plate for multiple-cell batteries active on both sides and provided with a connecting-strip projecting from one edge of the plate on both sides thereof, and located out of the median line transverse to said edge.

7. A battery comprising a plurality of cells having bipolar separating-plates, suitably spaced apart to form side walls of the respective cells, active supplemental plates alternating in polarity in each of said cells, and a connecting-strip secured to each separating-plate projecting therefrom transversely of each adjacent cell, and connected to all plates in said cell of like polarity to the surface of the plate included in said cell.

In testimony that I claim the foregoing as my own I affix my signature in presence of two witnesses.

JULIUS E. HASCHKE.

In presence of—
FRANK HULETT,
MARY F. ALLEN.